(12) United States Patent
Hysky (10) Patent No.: US 8,375,670 B2
(45) Date of Patent: Feb. 19, 2013

(54) INSULATING ASSEMBLY

(75) Inventor: Johannes Hysky, Leichlingen (DE)

(73) Assignee: pinta production S.A., Courgenay (CH)

( * ) Notice: Subject to any disclaimer, the term of this patent is extended or adjusted under 35 U.S.C. 154(b) by 0 days.

(21) Appl. No.: 12/925,026

(22) Filed: Oct. 12, 2010

(65) Prior Publication Data

US 2011/0091679 A1   Apr. 21, 2011

(30) Foreign Application Priority Data

Oct. 19, 2009 (DE) .......................... 10 2009 044 286

(51) Int. Cl.
E04B 2/00 (2006.01)
(52) U.S. Cl. ................. 52/506.06; 52/506.05; 52/475.1; 52/476; 52/770; 52/772
(58) Field of Classification Search ................. 52/302.1, 52/506.05, 506.06, 506.02, 475.1, 476, 770, 52/772
See application file for complete search history.

(56) References Cited

U.S. PATENT DOCUMENTS

| | | | |
|---|---|---|---|
| 2,984,312 A | 5/1961 | Brisley et al. | |
| 4,467,580 A * | 8/1984 | Sowinski | 52/302.1 |
| 4,799,631 A | 1/1989 | Humphries | |
| 4,804,571 A | 2/1989 | Jouffreau | |
| 5,379,561 A * | 1/1995 | Saito | 52/235 |
| 5,415,510 A * | 5/1995 | Funaki et al. | 411/384 |
| 5,542,225 A * | 8/1996 | Endo et al. | 52/511 |
| 5,848,512 A * | 12/1998 | Conn | 52/837 |
| 5,849,407 A | 12/1998 | Seibert | |
| 5,860,257 A * | 1/1999 | Gerhaher et al. | 52/235 |
| 5,918,427 A * | 7/1999 | VanderWerf | 52/100 |
| 6,055,787 A * | 5/2000 | Gerhaher et al. | 52/546 |
| 6,205,731 B1 * | 3/2001 | Gerhaher | 52/506.01 |
| 6,668,505 B1 * | 12/2003 | Hohmann et al. | 52/565 |
| 6,694,694 B2 * | 2/2004 | Zeeff | 52/506.01 |
| 6,739,105 B2 * | 5/2004 | Fleming | 52/513 |
| 6,988,344 B1 * | 1/2006 | Krueger | 52/464 |
| 7,010,894 B1 * | 3/2006 | Cappelle | 52/480 |
| 7,073,301 B1 * | 7/2006 | Price | 52/477 |

(Continued)

FOREIGN PATENT DOCUMENTS

DE   1 273 778   7/1968
DE   78 36 050   12/1978

(Continued)

OTHER PUBLICATIONS

German Search Report dated Jul. 9, 2012 in German Patent Application No. 10 2009 044 286.3.

(Continued)

*Primary Examiner* — Brian Glessner
*Assistant Examiner* — Joshua Ihezie
(74) *Attorney, Agent, or Firm* — Collard & Roe, P.C.

(57) ABSTRACT

The invention relates to an insulating assembly (1) in a mobile object such as a ship or aircraft, the mobile object having carrier parts that are upstanding with respect to a wall and a carrier part being covered over in cross-section by a holding part (5), there also being a sheet-like insulating part (7) that is held between two carriers as a result of clamping formations (6) on the holding part (5). In order to provide an advantageous insulating assembly in a mobile object, it is proposed that the insulating part (7) comprises a foam-like self-supporting element (8) that is optionally covered over on one or both sides by a covering layer.

16 Claims, 13 Drawing Sheets

U.S. PATENT DOCUMENTS

| | | | |
|---|---|---|---|
| 7,584,582 B1 * | 9/2009 | Hutter, III | 52/506.02 |
| 7,681,368 B1 * | 3/2010 | Rubio | 52/309.12 |
| 7,845,120 B2 * | 12/2010 | Thome et al. | 52/144 |
| 8,037,653 B2 * | 10/2011 | Hohmann, Jr. | 52/379 |
| 8,056,289 B1 * | 11/2011 | Konstantin | 52/204.591 |
| 8,136,321 B1 * | 3/2012 | Bauman | 52/506.08 |
| 2003/0024192 A1 * | 2/2003 | Spargur | 52/309.4 |
| 2004/0256520 A1 | 12/2004 | Guard et al. | |
| 2009/0094923 A1 * | 4/2009 | Weir et al. | 52/506.01 |
| 2009/0107065 A1 * | 4/2009 | LeBlang | 52/252 |
| 2009/0288358 A1 * | 11/2009 | Snyder | 52/302.1 |
| 2010/0058700 A1 * | 3/2010 | LeBlang | 52/506.05 |
| 2010/0229484 A1 * | 9/2010 | Carolan et al. | 52/302.1 |
| 2010/0281784 A1 * | 11/2010 | Leo | 52/16 |
| 2011/0252731 A1 * | 10/2011 | Boyer et al. | 52/302.1 |
| 2011/0302865 A1 * | 12/2011 | Kliegle et al. | 52/483.1 |
| 2012/0055102 A1 * | 3/2012 | Fradera Pellicer | 52/167.1 |

FOREIGN PATENT DOCUMENTS

| | | |
|---|---|---|
| DE | 80 02 126 | 1/1980 |
| DE | 3820491 | 5/1995 |
| DE | 4405471 A1 | 7/1995 |
| DE | 19508892 | 9/1996 |
| DE | 195 47 672 A1 | 6/1997 |
| DE | 197 12 835 | 10/1998 |
| DE | 10301140 A1 | 1/2003 |
| EP | 214893 A1 | 3/1987 |
| EP | 279620 A2 | 8/1988 |
| EP | 0 971 862 | 1/2000 |
| EP | 1 449 764 A2 | 2/2004 |
| SU | 850 487 | 7/1981 |

OTHER PUBLICATIONS

English Translation of Relevant Parts of German Search Report dated Jul. 9, 2012 in German Patent Application No. 10 2009 044 286.3.

European Search Report dated Feb. 18, 2011 in EP 10 186935.

English translation of Relevant Parts of European Search Report dated Feb. 18, 2011 in EP 10 186935.

* cited by examiner

INSULATING ASSEMBLY

CROSS REFERENCE TO RELATED APPLICATIONS

Applicant claims priority under 35 U.S.C. §119 of German Application No. 10 2009 044 286.3 filed on Oct. 19, 2009, the disclosure of which is incorporated by reference.

The invention relates to an insulating assembly in a mobile object such as a ship or aircraft, the mobile object having carrier parts that are upstanding with respect to a wall and a carrier part being covered over in cross-section by a holding part, there also being a sheet-like insulating part that is held between two carriers as a result of clamping formations on the holding part.

Said carrier parts are also referred to in aircraft construction as stringers. They may also be supplemented by supporting angles. Such carrier parts extend along the wall and, at the bottom, are connected to the wall, for example riveted or welded. The free-standing height of the carriers is, for example, in a dimensional range from 0.1 to 1 m. All intermediate values, in particular in 1 mm increments, and in the same incremental steps with regard to narrowing the specified limits of the range one or more times from above and/or from below, are hereby included in the disclosure.

In the case of a known assembly of this type, the holding part is fitted over the carrier part, the holding part having a substantially U-shaped form. Accordingly, the U web engages over the free end edge of the carrier. The insulating parts comprise insulating parts enclosed in a film-like sheath. In aircraft construction, glass wool is predominantly used as the insulating material.

On the basis of the prior art described, it is an object of the invention to provide an advantageous insulating assembly in a mobile object.

One possible solution for achieving this object, according to a first aspect of the invention, is given by the subject matter of claim 1, it being provided that the insulating part comprises a foam-like self-supporting element that is optionally covered over on one or both sides by a covering layer. The first important aspect is that the insulating part is self-supporting, even without a covering. Self-supporting is understood here as meaning that, when an insulating part that is, for example, 2 cm thick and, for example, cm wide is restrained at one end, the downward bending at the free end over a free length of 5 to 10 times the thickness is less than the thickness of this material, that is in particular of a foam material. And this is on the basis of the material as such, that is to say without any incorporated carrier elements or the like. With regard to the mobile object, it may be any of a wide variety of objects. Apart from a ship or aircraft, it could, for example, be a train, bus, truck or heavy construction-site vehicle.

The insulating part is preferably formed as a panel part. Also preferably, it is covered over on one or both sides by a covering layer. In addition, it is a foam element or an element based on a bound foamed glass granulate. With respect to the foamed glass material mentioned, reference is made to DE 197 12 835 C3 or EP 971862 B1. With regard to the foam, melamine resin foam is preferred.

The covering layer is preferably disposed on one wide side and at least one wide side of the insulating part is also preferably formed in such a way that it is moisture-impermeable. Also preferably, the moisture-impermeable wide side is the side that has the covering layer mentioned, if only one covering layer is provided, and the moisture impermeability is provided by the covering layer. The covering layer may be a film or a textile layer. It may be water-tight or (only) water-repellent. It may also be air-tight or air-permeable. It may also be a "breathing" membrane; for instance corresponding to "Goretex". The fact that a covering layer that leaves an end face of the insulating part exposed is provided on the foam-like element mainly forming the insulating part means that the insulating part can advantageously enter into a moisture exchange with the surroundings via its end faces. With regard to use in an aircraft, this can also be used as a means for pressure equalization. Nevertheless, an effective barrier against moisture transport transversely through the insulating part is achieved.

It is also preferred here that the holding terminates, on the wide side, in a moisture-tight or almost moisture-tight manner with the associated wide side of the insulating part. Moisture removal can then take place inside the composite thereby formed by the holding part and the insulating part.

Further features of the invention are explained below, including in the description of the figures, often in their preferred association with the claim concept already discussed above, but they may also be associated with only one or more individual features that are described here, in particular features of the already discussed claim 1, or be of importance independently or in a different overall concept.

For instance, it is preferred that the holding part is a foam part. Also preferably, it is a flexible foam, for example a polyethylene foam. In this respect, it is additionally preferably a closed-cell foam. A foam which is formed in such a way that it inhibits or prevents moisture transport, at least in the region in which it interacts with the insulating part, for example by being provided with a skin or a separately applied film, may also be used. With regard to this foam, densities in the range of 20-40 kg/m$^3$ are preferred. All intermediate values, in particular in 0.5 kg/m$^3$ increments, and in the same incremental steps with regard to narrowing the specified limits of the range one or more times from above and/or from below, are hereby likewise included in the disclosure.

The clamping formations of the holding part come to lie at least partly against one or both flat sides of the insulating part. If a clamping formation only comes to lie against one side, it is preferably on the side of the mobile object that is facing the outer wall. In cross-section, the holding part accordingly preferably engages the insulating part in a U-shaped manner. Particularly if the holding part is formed from a virtually moisture-impermeable material, such as indeed a closed-cell foam, this supplements the moisture barrier provided by the covering layer on a flat side of the insulating part. Moreover, an advantageous damping of the carrier part is obtained. Consequently, this insulating assembly can advantageously also have an acoustic effect.

The holding part and/or the insulating part may, as already noted, consist of a rigid plastic, such as for instance twin-wall sheets or sheet material of recycled glass, as noted above for example a foamed glass compound.

The holding part or the insulating part may also consist of the material described above, the binding material being chosen such that a flexible part is obtained. The flexibility may be manifested by a part made of this material with a thickness of 1 cm, for example, and a rectangular formation of a length of 18 cm and another of 10 cm, being able to bend flexibly to such an extent that, when restrained on one narrow side, it can bend elastically by the stated thickness or more and also return again correspondingly when released.

Said covering layer in combination with the insulating part mainly consisting of foam also produces an advantageous sandwich structure, which is conducive to the stability of the insulating part. This also makes it possible to use a foam which does not in itself provide a requisite stability, which may be seen for instance in the requirement for a self-supporting base area of one or more square meters to be achieved; this with a thickness of the insulating part (including covering layer) of, for example, between 5 and 100 mm. An open-cell foam is particularly preferred. In addition, a melamine resin foam is preferred.

With regard to the holding part, it is also preferred that, in a corner region in which for instance a carrier angle butts against a stringer or a second stringer extending transversely to the first stringer, a first holding part meets a second holding part that extends at an angle to the direction of extent of the first holding part. In the case of the example, this second holding part may then be provided in such a way that it engages over the holding angle or the second stringer. It is also preferred in this respect that the two holding parts are adapted to one another in their form with regard to sealing in the corner region. This configuration makes it possible firstly to clamp said insulating part over its entire periphery in each case in a holding part. Moreover, because of the described way in which the moisture-impermeable form of the holding part is supplemented by the holding part, there is virtually no interruption even in such corner regions. However, it is not always required here that a completely moisture-tight termination is achieved. The aim is to obtain a substantially moisture-tight termination and/or acoustic insulation (seal).

A carrier, such as that referred to here, therefore specifically a stringer, may have an aperture. It is preferred in this respect that the aperture is also sealed by means of a foam part. It is particularly preferred that the sealing is achieved in conjunction with an element passing through the aperture, such as for example a cable or a cable run. In addition, it is particularly preferred that the foam part is part of the holding part. It can thus be formed on the holding part at the same time as when the parts required for the insulating assembly are fabricated, and then only has to be inserted into the respective opening as required during assembly.

Known holding parts are cut out from a raw material part having at least the height of the cross-section. To this extent, it is preferred here that, as a result of mitered formations, the cross-sectionally angled or, in particular, U-shaped holding part is formed from a flat part which corresponds only to an angled portion, that is to say for instance a U leg or U web, of the part in its thickness. For instance, such a holding part, in particular made of a foam, may be advantageously put together by folding. A saving of material can also be achieved. In the assembled state, self-holding of the holding part is obtained in any case in conjunction with the clamped insulating parts. As a result of the holding, these press the holding part against the perpendicular flat side of a carrier. Moreover, a carrier may have in cross-section an angle or T profile at its free end. The holding part is hereby preferably additionally held on the carrier in a form-fitting manner. It may, however, also be held by an initially provisional securement, for the time of assembly, for instance through an aperture through the carrier.

In addition or as an alternative to a film-like covering layer, a cavity-resonator-like covering of an insulating part may be provided, or the insulating part may be formed as a whole in this way. Such coverings are widely known. It may, for example, be a perforated plate which is disposed flat at a distance from the flat side of the insulating part or else connected directly to the flat side of the insulating part, that is to say the foam part. Such a perforated plate may also consist of a hard material, but it may also comprise a further foam layer, for instance a layer of closed-cell foam, which has appropriate holes.

It is firstly preferred that an insulating part is held in a self-supporting manner in the holding elements provided at the edges. In the case of particularly large insulating parts or in the case where special securement is additionally desired or required, it may, however, also be provided that the insulating part is additionally supported or passed through for anchoring purposes by holding rods disposed at a distance from the carriers. If they pass through the insulating part, these holding rods may, for example, be up-set at the head, in order to stop the insulating elements from falling out. On account of the preferably elastic formation of the insulating part, however, it is nevertheless not ruled out that the insulating elements can be correspondingly removed without being significantly damaged.

With regard to the insulating part, densities in the range of 4-14 $kg/m^3$ are preferred with respect to foam, in particular approximately 6 $kg/m^3$ with respect to melamine resin foam. With respect to a possible foamed-glass-based insulating part, somewhat higher densities, up to the range of 80 $kg/m^3$, beginning at around 10 $kg/m^3$, are preferably used. Also in this respect, all intermediate values of the magnitude specified, that is to say in incremental steps of 0.5 $kg/m^3$, including with regard to the stated possible narrowing of the limits of the range from above and/or below, are hereby included in the disclosure.

The invention is explained further below with reference to the accompanying drawing, which however merely represents exemplary embodiments and in which.

Figure 1:
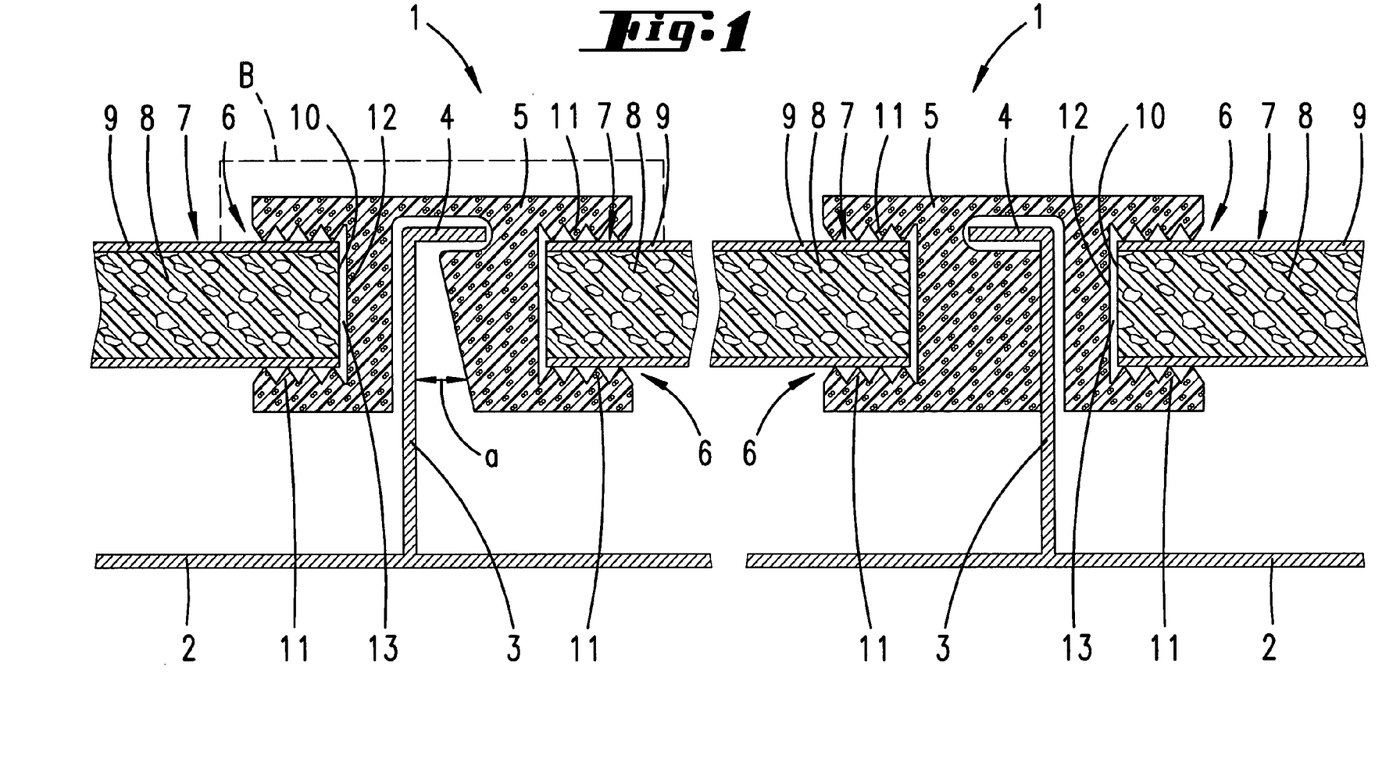
FIG. 1 shows a schematic cross-sectional view of an insulating assembly on the wall of an aircraft.

Shown and described, initially with reference to FIG. 1, is an insulating assembly 1, here in an aircraft. It shows a cross-section of an outer wall 2 of an aircraft, disposed on the inside of which are upstanding stringers 3, which have, with respect to the cross-section, an angled portion 4 at their free end. Such a carrier part or stringer 3 is covered over by a holding part 5. The holding part 5 is as it were fitted over the stringer from above, from the free end. Laterally, i.e. in the direction of the outer wall 2, the holding part has clamping formations 6, by means of which an insulating part 7 is held between two carriers 3 of this type that are covered over by holding parts 5.

The insulating part comprises a foam layer 8, the face of which, in the case of the exemplary embodiment, is covered over on both sides by a covering layer 9. The covering layer may be held on the foam part 8 by means of adhesive. It may also, for example, be laminated on, i.e. by heating up the foam part 8 and/or the covering layer 9 on the flat side to be bonded to above a melting point of the materials concerned and pressing one part onto the other part. The covering layer 9 may, in particular, comprise a water-impermeable plastics film.

In the case of the exemplary embodiment, by means of the covering layer 9, the foam element 8 is formed in such a way that it is moisture-impermeable on both sides.

However, as can be seen, the foam part 8 has uncovered end faces 10, which here are respectively facing the holding part 5. By way of these uncovered end faces, the insulating part 7 can "breathe".

In the case of the exemplary embodiment, a holding part 5 consists of a PE foam.

It can be seen that, for the clamping of an insulating part 7, a clamping formation is formed, in the case of the exemplary embodiment of FIG. 1 a U-shaped clamping formation, which moreover is preferably formed with cross-sectionally zigzag-shaped formations 11 respectively toward the insulating part 7. The holding part 5 is in any event disposed at a distance a from the outer wall of the stringer 3 with respect to one of the two stringers 3 in each case between which the insulating part is held. This provides the possibility with regard to assembly of exploiting the flexibility of the holding part 5 and inserting the insulating part, after which the holding part springs back again and holds the insulating part in the way shown.

A region B of the holding part indicated by broken lines, i.e. here on the side of the insulating part 8 that is facing away from the outer wall 2, may also optionally be omitted. The abutment may be provided here by a wall paneling or the like of the interior space. Of course, a middle region of this may still be preserved, in order to create the U engagement around the stringer 3. With respect to further embodiments, also see for instance FIG. 9 or FIG. 13; however, this engagement may then also optionally be omitted.

Figure 2:
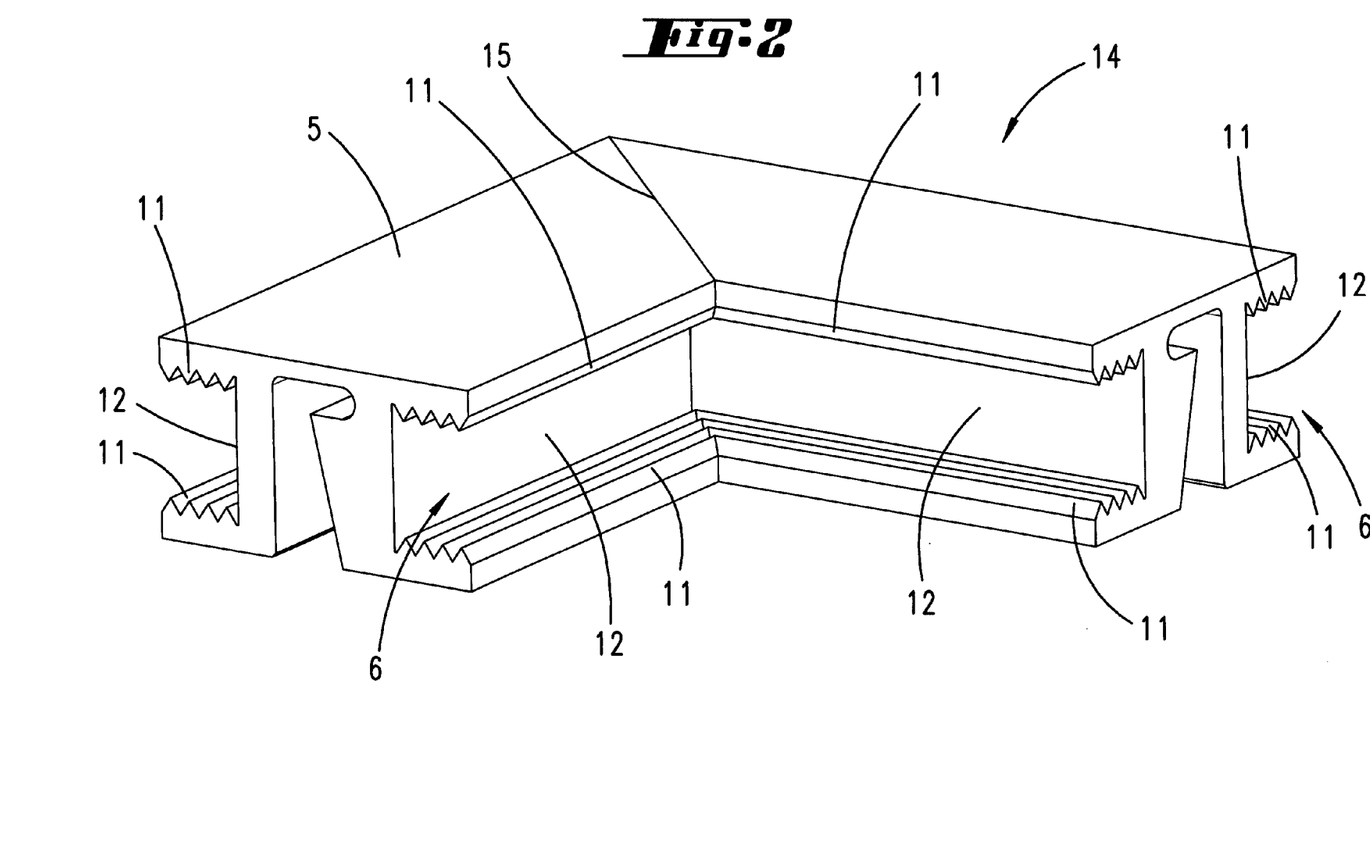
FIG. 2 shows a perspective representation of a corner formation of a holding part.

Between one end face 10 and an associated wall region 12 of the holding part 5 there preferably remains, as shown, an air space 13. With reference to FIG. 2, a holding part 5 is shown in part, on its own and in a perspective view, here with respect to a corner formation 14. It can be gathered that, on account of the mitered configuration, see the profile of the end edge 15, an almost tight seal is also ensured in the corner region. The holding formations 6 complement one another in the corner region, in order in this way also to reliably hold and substantially seal a corner of the insulating part there.

Figure 3:
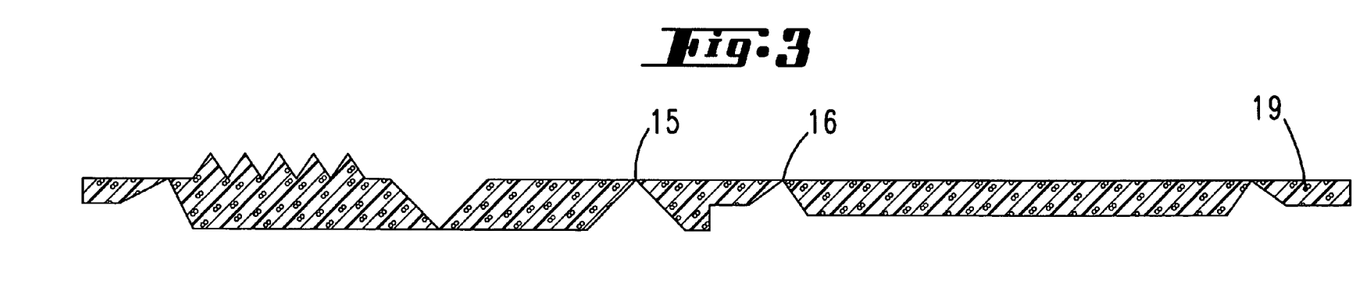
FIG. 3 shows a cross-section through a holding part before assembly.
Figure 4:
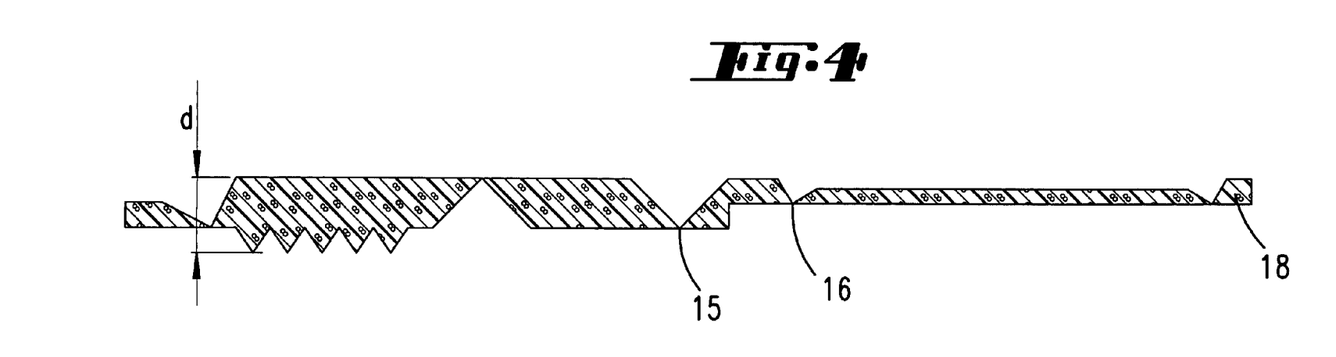
FIG. 4 shows a representation according to FIG. 3 of a further holding part.

FIGS. 3 and 4 respectively show a cross-section through an opened-out holding part. This is a preferred configuration, in which the holding part is formed by an appropriate flat part, here made of foam.

It can be seen that a flat part that has a maximum thickness d can be taken as a starting point. By making separating cuts and miter cuts, which however in each case preferably leave a connection such as for instance at 15, 16, a holding part that is in each case continuous can be made from a flat part.

Figure 5:
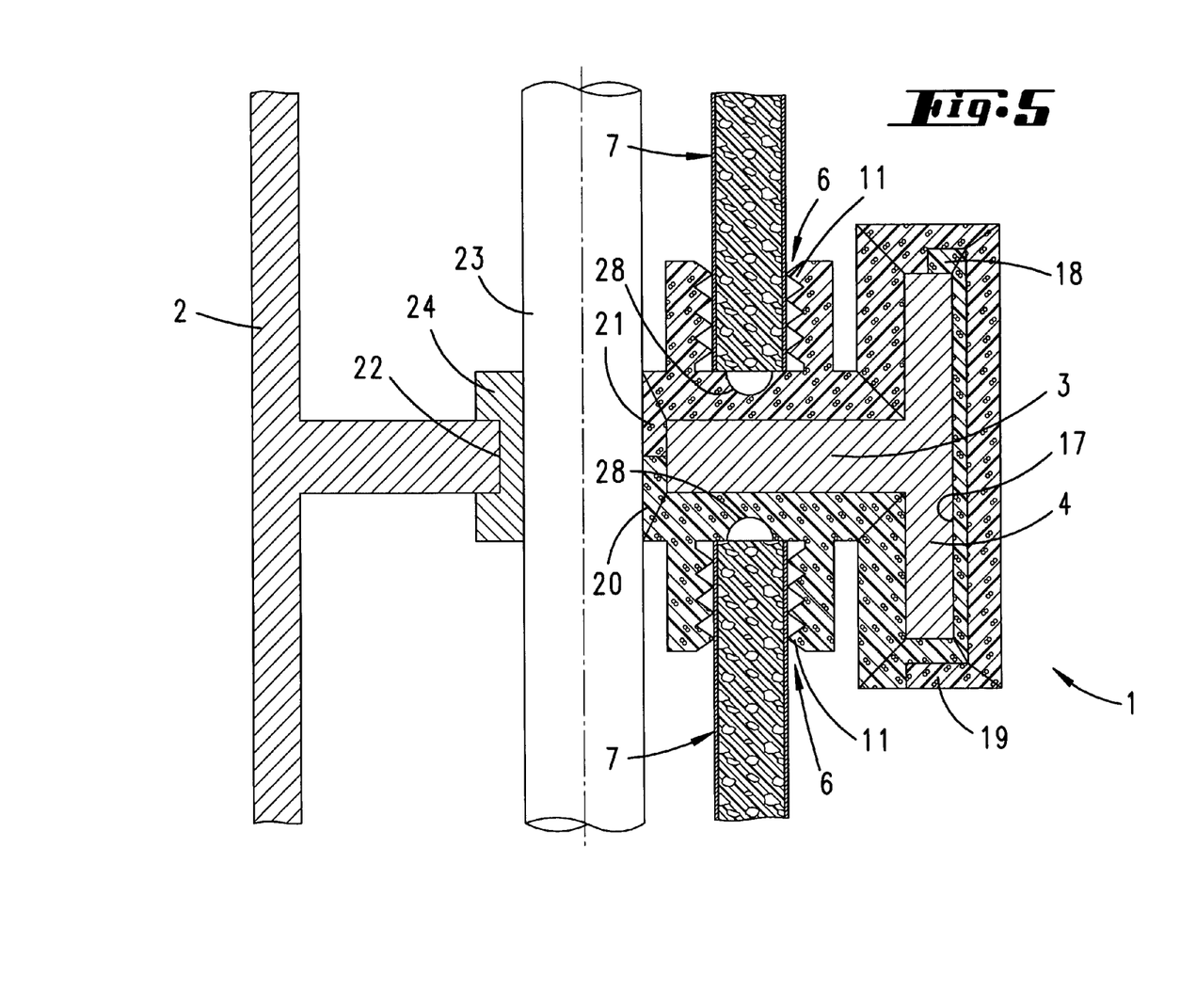
FIG. 5 shows a cross-section through the holding parts according to FIG. 3 and FIG. 4, in the fitted state.

The way in which appropriate flat parts are installed by being put together to form an overall holding part is represented in cross-section in FIG. 5. The fact that the parts are made to overlap in the head region of the carrier, to be specific are disposed as two layers at the end face of the in this case T-shaped carrier, see face 17, also with engagement at the edges, see engaging offsets 18 and 19, means that advantageous nesting is obtained in the installed state, so that holding is achieved even in a state in which the fixing of the holding part on the carrier by an inserted insulating part 7 has possibly not yet been achieved. In addition or as an alternative to the described double-layered configuration at the head, an additional support may also be achieved, which may possibly be the only support, by engaging regions 20, 21, associated with an aperture 22 in the carrier, through which for example a cable run 23 is led. In this case, a support may be achieved on the underside by a counter insulating part 24.

Figure 6:
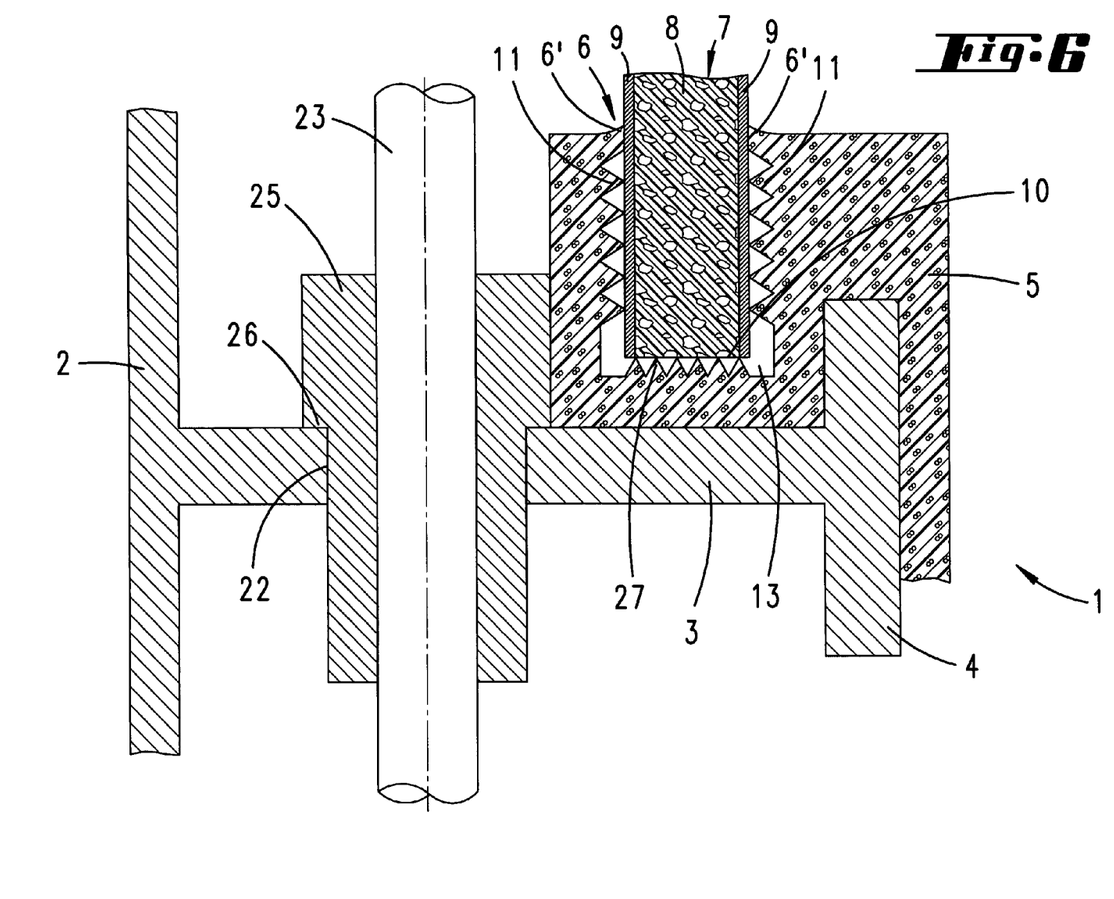
FIG. 6 shows a representation partly according to FIG. 1, with an alternative form of the holding part and additional carrier cavity insulation.

In the case of the embodiment of FIG. 6, it is firstly of importance that the aperture 22 is passed through by its own tubular insulating part 25. This insulating part has an offset 26 at one end, so that it can be inserted into the aperture 22 from one side, but cannot go right through. In the case of this exemplary embodiment too, this insulating part 25 is, for example, passed through by a cable run 23. The insulating part 25 is formed here independently of the holding part 5.

Moreover, the holding part 5 has, associated with an end face 10 of the insulating part 7, cross-sectionally zigzag-shaped projections 27, which here lie against the end face 10 and as it were form separate channels, for instance for receiving moisture. The insulating parts may be provided with such dimensions that they inevitably come to lie in this way when an insulating part 7 is fitted. A certain oversize of the insulating part 7 in this respect allows this to be achieved, since the projections are flexible. In particular, the front projections, see reference numeral 6', are formed with a greater extent in each case toward the projection lying opposite, so that in the fitted-together state of the insulation, as also represented in FIG. 6, a clear bending deflection is obtained, so that there is a secure termination with the surface of the insulating part 8 in the manner of a sealing lip. The oversize may be, for example, 2 to 10 mm, here, with reference to the dimensioning by which contacting is just achieved, all intermediate values, in particular in 0.1 mm increments, also being included hereby in this disclosure.

Figure 7:
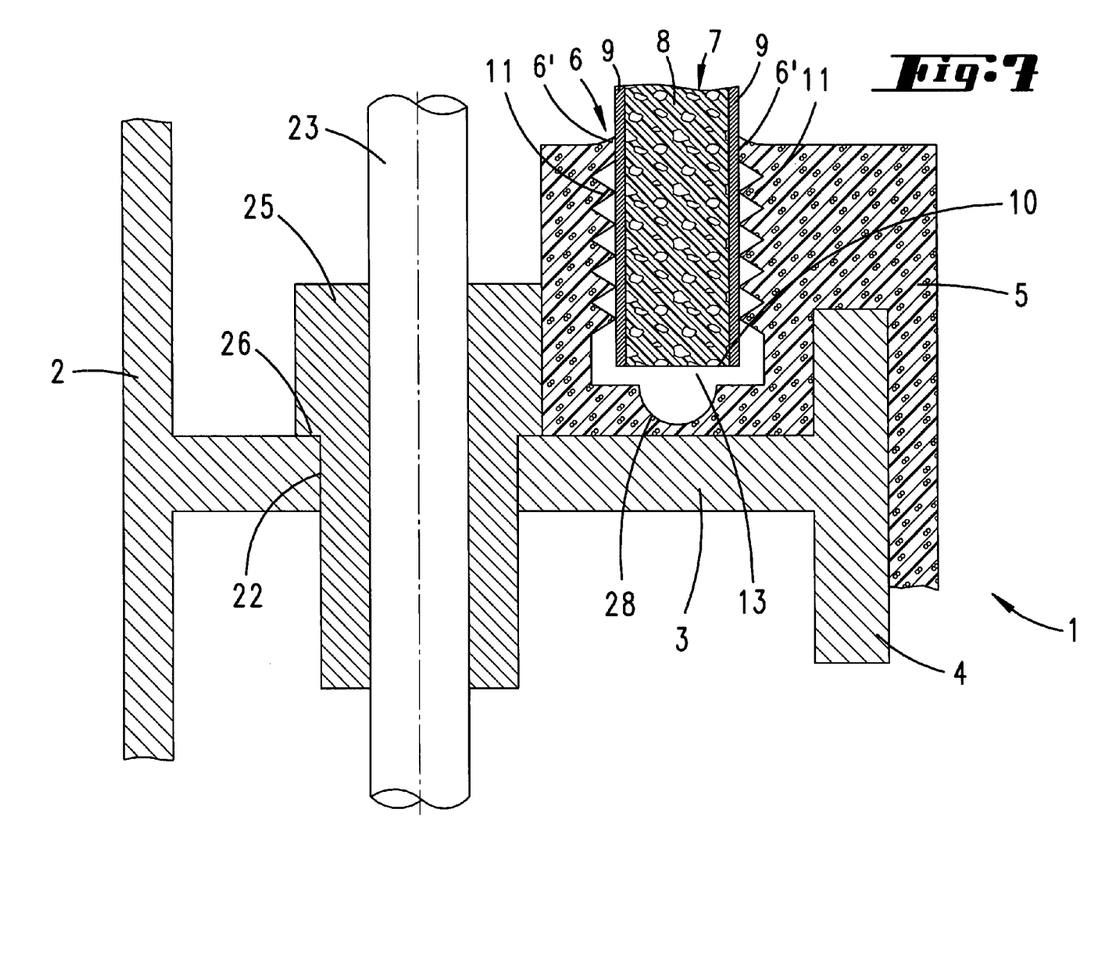
FIG. 7 shows a representation according to FIG. 6 in another alternative configuration.

In the case of the exemplary embodiment of FIG. 7, the side of the U web that is facing the end face 10 of the holding formation, U-shaped as a whole, in the holding part 5 is provided with a channel 28 that produces an advantageously large space for receiving moisture, which for instance comes out from the end face of the insulating element.

Figure 8:
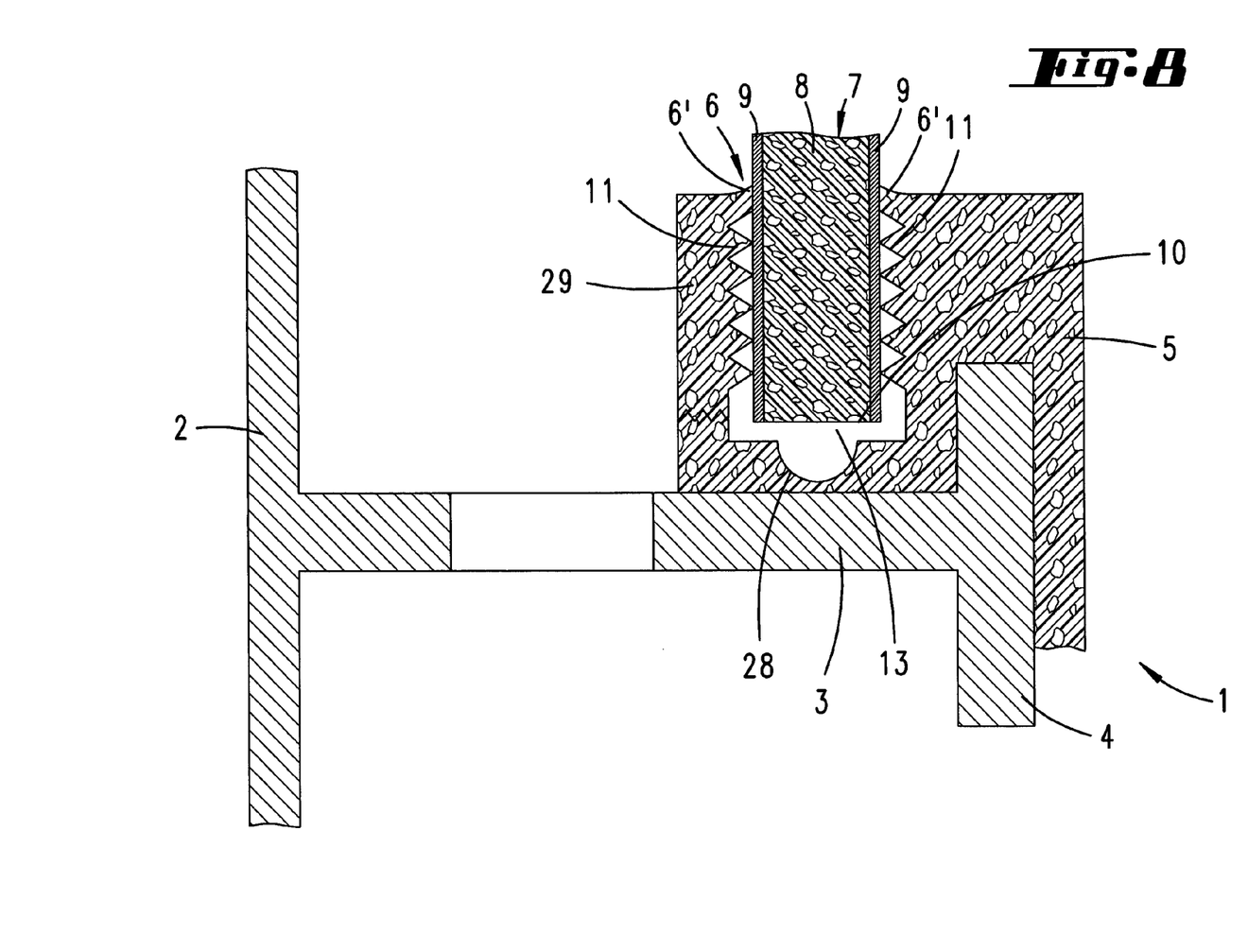
FIG. 8 shows a further representation according to FIG. 6 or FIG. 7 in an alternative configuration.

In the case of the exemplary embodiment of FIG. 8, the situation is approximately the same as in the case of the exemplary embodiment of FIG. 7. Here it is only illustrated that the U-shaped holding configuration of the holding part 5, or associated with the holding part 5, can also be formed, here on the underside, with the aid of an additional part 29, which is not necessarily formed as one part with the holding part 5.

Figure 9:
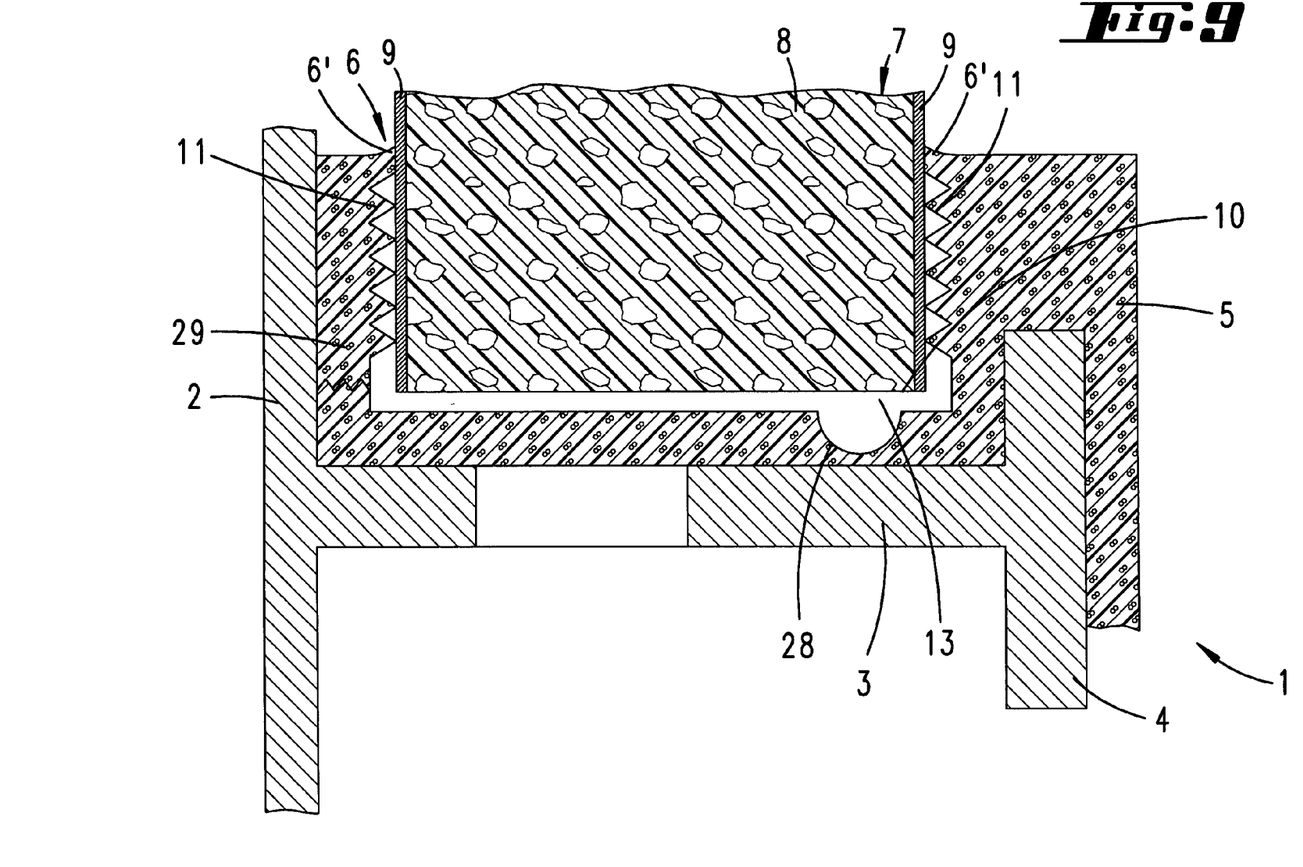
FIG. 9 shows a further representation according to FIGS. 6 to 8, in a further alternative configuration.

The embodiment of FIG. 9 corresponds in principle to the embodiment of FIG. 8. Here it is just that the insulating part 7 is provided with such a thick dimension that the lower engagement of the holding part at the same time rests on the outer wall 2. This achieves a minimization of the free air space. As can be seen, and as indicated by the zigzag line, this also makes it possible in any event for the engagement by the holding part to be formed from two separate foam parts or other materials. There is no need for a one-part construction, since the support is provided by the fit between the insulating part 7 and the outer wall 2.

Figure 10:
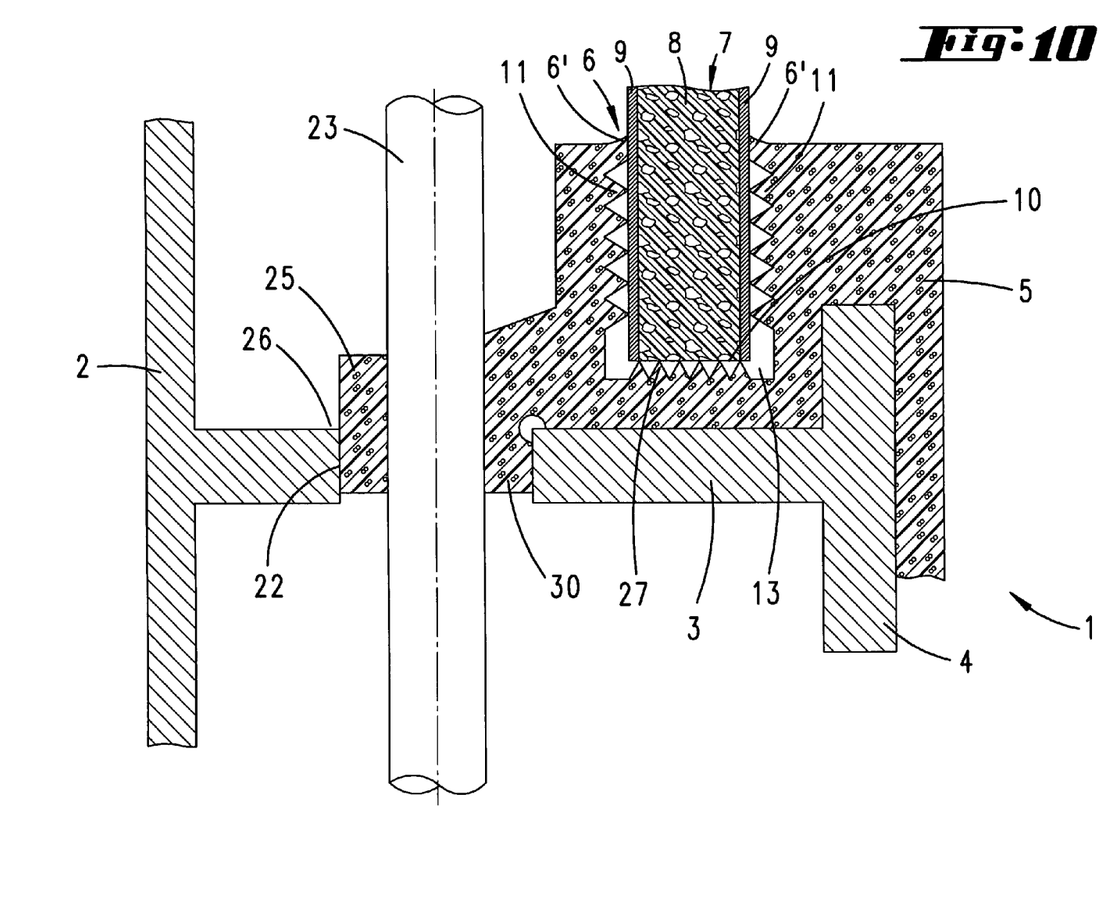
FIG. 10 shows a further representation of an alternative embodiment corresponding to FIGS. 6 to 9.

In the case of the exemplary embodiment of FIG. 10, the holding part 5 is formed as one part with a cavity insulation 30, through which here once again a cable run is led. However, as is also possible in principle in the case of the exemplary embodiments previously described, the cavity insulation may completely close the aperture without other parts being brought through.

Figure 11:
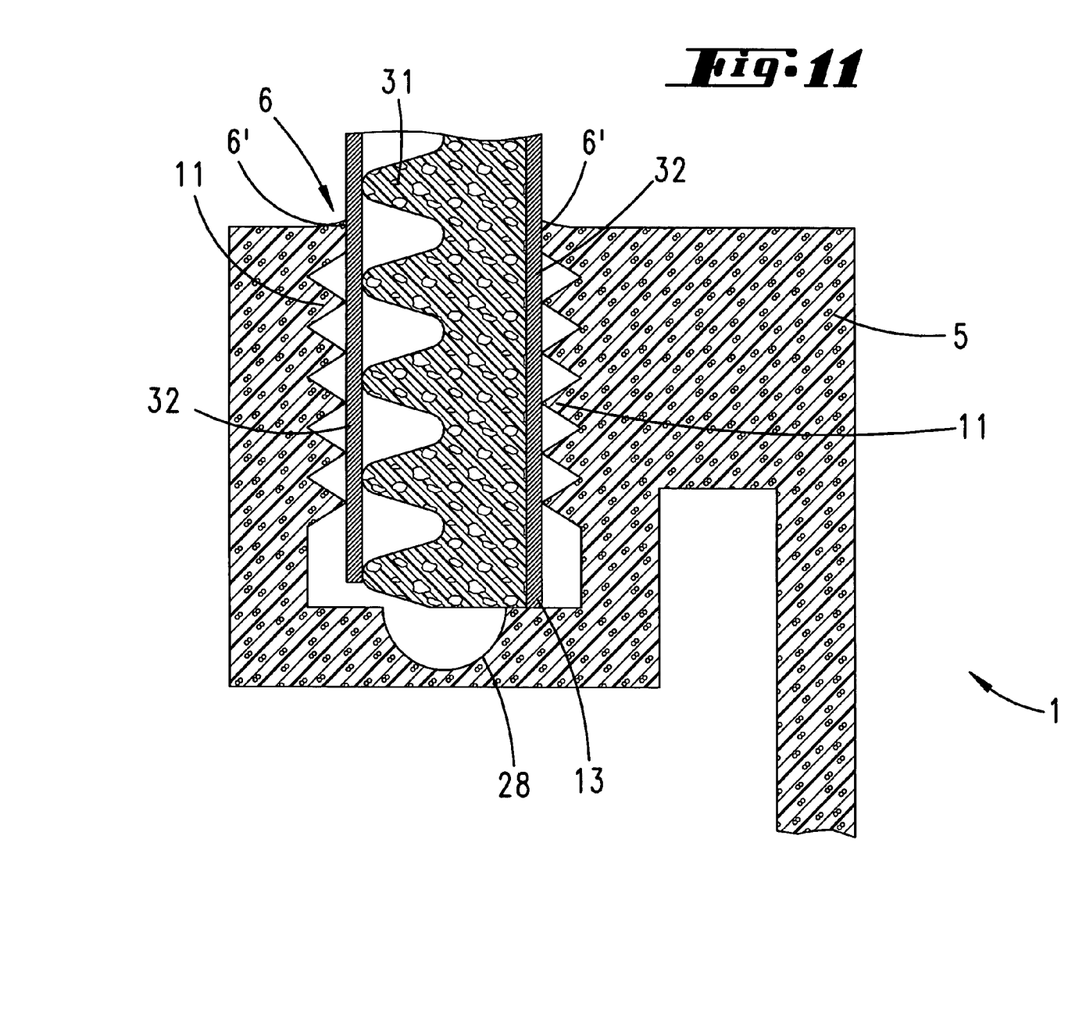
FIG. 11 shows a schematic cross-sectional view of a mounted acoustically active insulating part.

In the case of the subject matter of FIG. 11, just a holding part 5 with an insulating part 7 is schematically shown, the insulating part 7 being formed as a specially designed acoustically active part. On the underside, i.e. preferably facing the outer wall of the mobile object, the foam part of the insulating part 7 has a nubbed formation 31. This is covered over by a covering layer 32. Here, the covering layer 32 is preferably of an acoustically active, i.e. porous, design. It may, however, also be designed as a moisture-tight film, since acoustic influencing can also be achieved in conjunction with the nubs 31 by oscillations. In the case of this embodiment and also the further embodiments described with regard to a foam part, an identical formation may also be designed with regard to a part based on an expanded glass, as well as material of other formulations.

Figure 12:
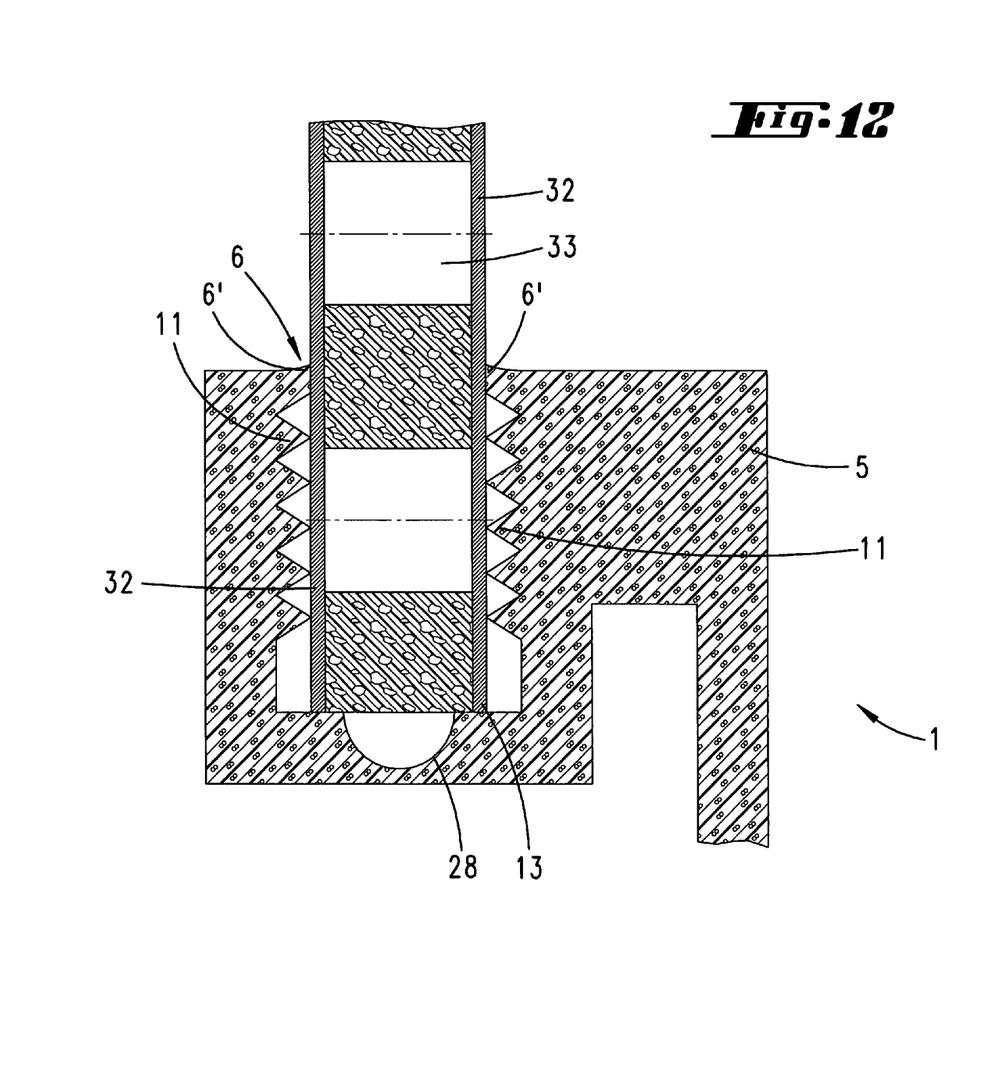
FIG. 12 shows a representation according to FIG. 11, with the insulating part taking the form of a cavity resonator.

The embodiment of FIG. 12 concerns a design comparable to that of the embodiment of FIG. 11. Here it is just that the foam element of the insulating part is formed throughout as a cavity resonator. Through-holes 33 are provided, but they are covered over on the outside by a continuous covering layer.

Figure 13:
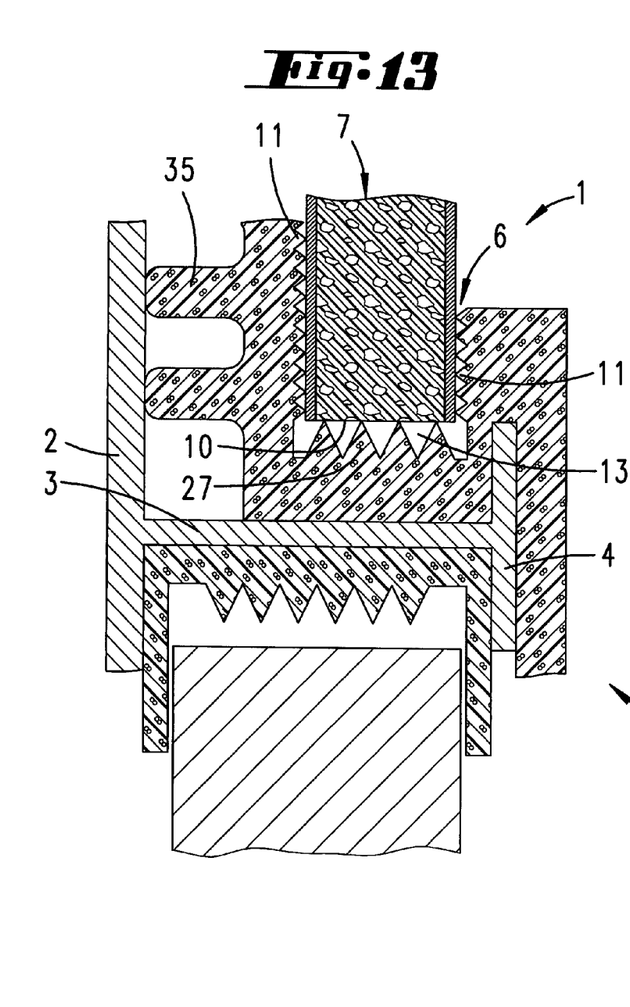
FIG. 13 shows a representation according to one of FIGS. 6 to 10, with additional bottom support.
Figure 14:
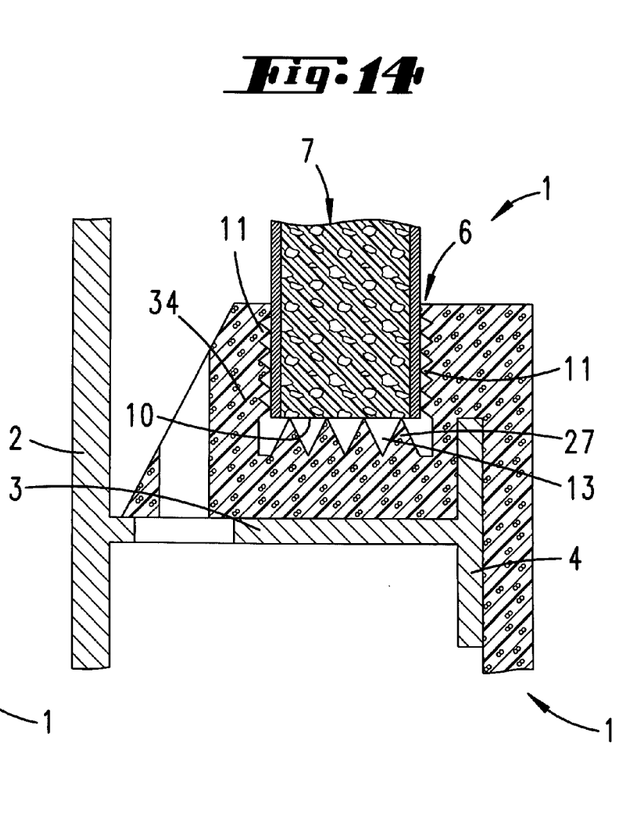
FIG. 14 shows a representation according to FIG. 13, in a further alternative configuration.

The embodiments of FIGS. 13 and 14 illustrate that, on the one hand, FIG. 14, an integral holding portion 34 for a lead-through, for instance of a cable cabinet, can be provided through an aperture in the carrier without engaging in the aperture. The embodiment of FIG. 13 illustrates that the holding part can also be supported on the wall of the mobile object by means of integral supporting formations 35.

Figure 15:
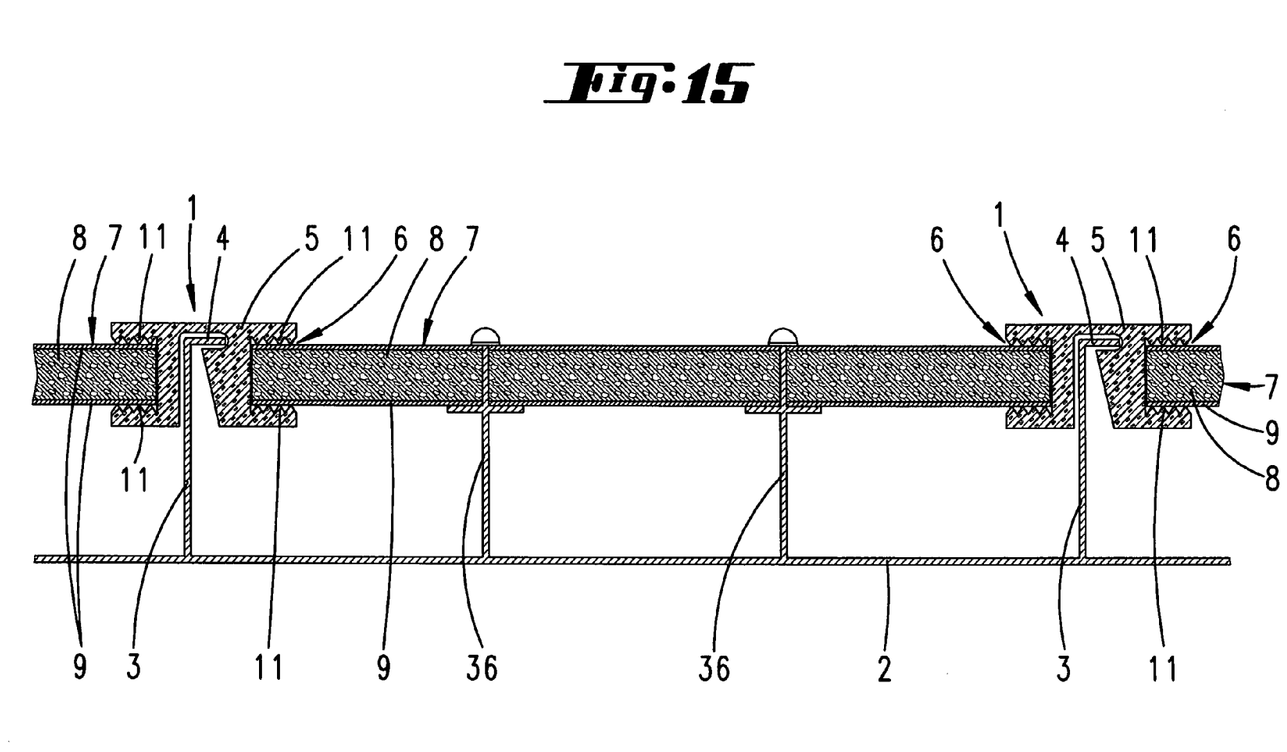
FIG. 15 shows a schematic representation according to FIG. 1 with additional holding pin anchorage.

The embodiment of FIG. 15 finally shows a variant in which the insulating part can be additionally fixed centrally on the wall by means of holding rods 36, in the self-supporting region between two holding elements 5.

All features disclosed are (in themselves) pertinent to the invention. The disclosure content of the associated/accompanying priority documents (copy of the prior patent application) is also hereby incorporated in full in the disclosure of the application, including for the purpose of incorporating features of these documents in claims of the present application. The subclaims characterize in their optionally independent wording independent inventive development of the prior art, in particular for the prosecution of divisional applications on the basis of these claims.

LIST OF REFERENCE NUMERALS

1 Assembly
2 Outer wall of aircraft
3 Carrier
4 Angled portion
5 Holding part
6 Clamping formation 6' Clamping formation
7 Insulating part
8 Foam part, layer
9 Covering layer
10 End face
11 Zigzag-shaped formation
12 Wall region
13 Air space
14 Corner formation
15 Connection
16 Connection
17 Face
18 Engaging offset
19 Engaging offset
20 Engaging region
21 Engaging region
22 Aperture
23 Cable run
24 Counter insulating part
25 Insulating part (tubular)
26 Offset
27 Projections
28 Channel
29 Additional part
30 Cavity insulation
31 Nubbed formation
32 Covering layer
33 Holes
34 Integral holding portion
35 Supporting formations
36 Holding rods
a Distance
B Region
d Maximum thickness

The invention claimed is:

1. Insulating assembly (1) in a mobile object,
the mobile object having carrier parts that are upstanding with respect to a wall and a carrier part being covered over in cross-section by a holding part (5), there also being a sheet insulating part (7) that is held between two carrier parts as a result of clamping formations (6) located on an inner surface of the holding part (5),
wherein the insulating part (7) comprises a self-supporting foam element (8) that is covered over on one or both sides by a covering layer, and
wherein the holding part (5) is a moisture impermeable foam part having a U-structure in cross section that form the clamping formations, the U-structure extending parallel to the wall.

2. Assembly according to claim 1, wherein the covering layer is disposed on a flat side and wherein at least one flat side of the insulating part (7) is formed in such a way that it is moisture-impermeable.

3. Assembly according to claim 1, wherein the holding part (5) is a foam part (8).

4. Assembly according to claim 1, wherein the holding part (5) consists of a closed-cell foam.

5. Assembly according to claim 1, wherein the holding part (5) consists of a PE foam.

6. Assembly according to claim 1, wherein the holding part (5) consists of a foamed glass granulate.

7. Assembly according to claim 1, wherein the moisture-impermeable form is achieved by the covering layer (9).

8. Assembly according to claim 1, wherein, in a corner region, a first holding part (5) meets a second holding part (5) that extends at an angle to the direction of extent of the first holding part, and wherein the two holding parts are adapted to one another in their form with regard to sealing in the corner region.

9. Assembly according to claim 1, wherein the insulating part (7) consists of a bound foamed glass granulate.

10. Assembly according to claim 9, wherein the bound foamed glass granulate is flexible.

11. Assembly according to claim 1, wherein the carrier part (3) has an aperture (22) and wherein the aperture (22) is sealed by means of a foam part (8).

12. Assembly according to claim 1, wherein the sealing is achieved in conjunction with an element passing through the aperture (22), such as for example a cable or a cable run.

13. Assembly according to claim 1, wherein the foam part (8) is part of the holding part (5).

14. Assembly according to claim 1, wherein a holding part (5) extends in a cross-sectionally angled manner, for example in the shape of a U, and wherein, as a result of mitered formations, this holding part (5) is formed from a flat part which corresponds only to an angled portion of the part in its thickness.

15. Assembly according to claim 1, wherein the insulating part (7) has a cavity-resonator covering on the inside or outside.

16. Assembly according to claim 1, wherein the insulating part (7) is additionally anchored by means of holding rods (36) that are upstanding on the wall and disposed at a distance from the carrier.

* * * * *